US012627566B2

(12) United States Patent
Christofi et al.

(10) Patent No.: US 12,627,566 B2
(45) Date of Patent: May 12, 2026

(54) DYNAMIC RE-CONSTITUTION OF A SOFTWARE DEFINED PERIMETER (SDP) FOR MICRO-SERVICES NETWORK APPLICATIONS IN A 5G/6G NETWORK

(71) Applicant: eBOS Technologies, Nicosia (CY)

(72) Inventors: Loizos Christofi, Nicosia (CY); Stelios Christofi, Nicosia (CY); Fanos Christofi, Nicosia (CY)

(73) Assignee: EBOS TECHNOLOGIES, Nicosia (CY)

( * ) Notice: Subject to any disclaimer, the term of this patent is extended or adjusted under 35 U.S.C. 154(b) by 173 days.

(21) Appl. No.: 18/212,558

(22) Filed: Jun. 21, 2023

(65) Prior Publication Data

US 2024/0406070 A1      Dec. 5, 2024

(51) Int. Cl.
H04L 41/0895 (2022.01)
H04L 9/40 (2022.01)

(52) U.S. Cl.
CPC .......... H04L 41/0895 (2022.05); H04L 63/08 (2013.01); H04L 63/1416 (2013.01); H04L 63/1425 (2013.01)

(58) Field of Classification Search
None
See application file for complete search history.

(56) References Cited

U.S. PATENT DOCUMENTS 10,083,026 B1 * 9/2018 Venkata .................. G06F 8/656
12,238,064 B1 * 2/2025 Christofi ............... H04W 12/06

2017/0026355 A1 * 1/2017 Mathaiyan .......... H04L 63/0428
2018/0241807 A1 * 8/2018 Calo ...................... H04L 47/781
2019/0372852 A1 * 12/2019 Aparicio ............. H04L 41/0896
2021/0227038 A1 * 7/2021 Mitsov .................. H04L 9/3213
2021/0409403 A1 * 12/2021 Lewin ................... H04L 67/145
2022/0045854 A1 2/2022 Bareket
2022/0182332 A1 * 6/2022 Christofi ............... H04L 47/803
2022/0329477 A1 * 10/2022 Chiganmi ........... H04L 41/0654

FOREIGN PATENT DOCUMENTS

CN        109561066 A      2/2022
CN        115242430 A      10/2022
KR        20180046476 A      5/2022
WO      WO-2020068521 A1      4/2020
WO      WO-2023279782 A1      1/2023

* cited by examiner

*Primary Examiner* — Scott B Christensen
(74) *Attorney, Agent, or Firm* — CRGO Global; Steven M. Greenberg

(57)      ABSTRACT

Dynamic re-constitution of a software defined perimeter (SDP) for micro-services network applications in a 5G/6G telecommunications network includes authenticating both a device and also a user of the device seeking access to an initial set of network resources defining an initial SDP and, responsive to the authentication, generating an individual network communications link through a northbound API to one or more micro-services network applications of the initial SDP. Data traffic from the micro-services network applications is monitored over the link and the monitored data traffic is submitted to a predictor predicting a traffic pattern necessitating a change in the initial set of the network resources of the initial SDP. Finally, in response to the prediction of the traffic patterns, a new SDP is defined with a different set of the network resources, the network communications link terminated, and a new communications link established between the authenticated device and the new SDP.

15 Claims, 3 Drawing Sheets

DYNAMIC RE-CONSTITUTION OF A SOFTWARE DEFINED PERIMETER (SDP) FOR MICRO-SERVICES NETWORK APPLICATIONS IN A 5G/6G NETWORK

CROSS-REFERENCE TO RELATED APPLICATIONS

This application claims priority under 35 U.S.C. § 119(a) to Greece patent application number 20230100446, filed on Jun. 2, 2023, the entire teachings of which are incorporated herein by reference.

BACKGROUND OF THE INVENTION

Field of the Invention

The present invention relates to the field of network resource allocation in an advanced cellular telecommunications network and more particularly to network resource allocation in a software defined network (SDN).

Description of the Related Art

The SDN is a technology that separates the control plane management of different connected network devices, from the underlying data plane that forwards network traffic to the devices. In this regard, an SDN architecture features software-defined controllers abstracted from the underlying network hardware, while offering intent-based or policy-based management of the network as a whole. This results in a network that is better aligned with the needs of application workloads through automated provisioning, programmatic network management, pervasive application-oriented visibility, and where needed, direct integration with cloud orchestration platforms.

The separation of the control from the data plane in a network architecture remains the paramount feature of the SDN. Yet, SDN is more in that the SDN has a centralized or distributed intelligent entity that enjoys an entire view of the network, so as to make routing and switching decisions based on that view. In comparison, legacy network routers and switches only know about neighboring network equipment However, with a properly configured SDN environment, that central entity can control everything, from easily changing policies to simplifying configuration and automation across the enterprise. As can be seen, the principle of the SDN can find wide applications not just in connection with the management of a computer communications network, but also in the implementation and management of a cellular telecommunications network incorporating a computer communications network. As to the latter, the SDN forms an integral part in the current and emerging cellular telephony space such as 5G or 6G.

The SDN includes two different application programming interfaces (APIs): southbound and northbound. The southbound API is the protocol specification that enables communication between controllers and switches and other network nodes, which is with the lower-level components. The southbound API further allows the router to identify network topology, determine network flows and implement request sent to it via northbound interfaces. In contrast, the northbound API allows communication amongst the higher-level components. While a traditional network relies upon a firewall or load balancer to control data plane behavior, the SDN installs applications that use the controller and these applications communicate with the controller through its northbound interface. In the context of the SDN, these applications are known as micro-services network applications.

Of note, the northbound API provides the functionality necessary for micro-services network applications seeking deployment in the SDN to ensure that the desired resources including memory and processor resources are available and allocated to the micro-services network applications in a self-service model. To that end, the northbound API in the SDN—particularly in the mobile communications network model such as 5G—usually is static in form. As such, when deploying a micro-services network application to the mobile network, the micro-services network application can configure its desired resources only in so far as an understanding exists between the micro-services network application to be deployed and the current state of the northbound API. But the northbound API can change over time.

Part of the configuration of resources for access through the northbound API is the desirability to provide access only to those resources absolutely required for the effective operation of the associated micro-services network applications. The provisioning of additional, unnecessary resources results in an overprovisioned environment. In all aspects of computing, the overprovisioned environment oftentimes results in depriving other applications from access to needed resources. As well, the overprovisioned environment presents an unnecessary security risk by exposing the unneeded resources to actors of malicious intent.

To address the former, the notion of the SDP allows for a substantially more secure execution container for an application. Common in the domain of traditional enterprise network architecture, and often referred to as the "black cloud", the SDP provides for two components: a host and a controller. The host can initiate a connection, or the host can accept a connection. These actions are managed by a controller through a control channel. As such, the control plane of the SDP architecture is separate from the data plane. While there are several modes of operation of the SDP, one popular mode requires single packet authorization (SPA) in which a single packet is received from the client in an SDP gateway which listens for SPA packets. The content of the packet, upon decryption and authorization, prompts the SDP gateway to write a rule to a firewall which otherwise denies access to the internal network to permit the initiation of a mutual secure connection between the device and the targeted service. Once this connection is established, the firewall rules are removed making the service invisible to the outside world.

Thus, the deployment of an SDP architecture permits the selective exposure of a service to a single authenticating end user and corresponding device so that the service has limited exposure to the outside world. Consequently, the risk of intrusion is limited to the resources of the deployed SDP and the end user and corresponding device accessing the deployed SDP. However, the resources available to the service within the SDP are statically defined. As such, while the resource requirements of the service resulting from the interactions with the device of the end user may change, the environment defined by the SDP for the service do not. The net effect then, is either an overprovisioned or under-provisioned environment for the service—a suboptimal solution.

BRIEF SUMMARY OF THE INVENTION

Embodiments of the present invention address technical deficiencies of the art in respect to the optimal resource allocation of resources in a software defined cellular telecommunications network. To that end, embodiments of the present invention provide for a novel and non-obvious method for the dynamic re-constitution of a SDP for network applications in a 5G/6G telecommunications network. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a method for the dynamic re-constitution of a SDP for network applications in a 5G/6G telecommunications network includes authenticating both a device and also a user of the device seeking access to an initial set of network resources defining an initial SDP. In response to the authentication an individual data communications link may be generated through a northbound API to one or more micro-services network applications of the initial SDP provisioned for use by the authenticated device. Data traffic from the micro-services network applications over the individual data communications link is then monitored and the monitored data traffic submitted to a predictor so that the predictor may predict a traffic pattern necessitating a change in the initial set of the network resources of the initial SDP. For instance, the traffic pattern may indicate an attempted intrusion or an under-utilization of the network resources of the initial SDP necessitating a reduction in the network resources in the new SDP. Finally, in response to the prediction of the traffic patterns, a new SDP is defined with a different set of the network resources. Concurrently, the data communications link may be terminated while a new data communications link may be established between the authenticated device and the new SDP.

In one aspect of the embodiment, an SDP gateway agent may be positioned behind a firewall in the network that has been configured in a deny-all state, so that the SDP gateway agent may inspect a log for the firewall in order to identify SPA packets. Thereafter, both the authentication of both the device and also the user of the device, and also the generation of the individual network communications link may be performed responsive to each identified one of the SPA packets. Optionally, the firewall may be deployed as part of a stack managed by an SDP controller operating at a virtual network function (VNF) level and in front of the micro-services network applications.

In another embodiment of the invention, a data processing system is adapted for the dynamic re-constitution of a SDP for network applications in a 5G/6G telecommunications network. The system includes a host computing platform hosting in memory a multiplicity of central units (CUs) of the 5G/6G telecommunications network. The CUs each include a communicative coupling to a multiplicity of different distributed units (DUs), with at least one of the DUs having a an antenna such as a massive multiple input, multiple output (MIMO) antenna transmitting over millimeter wave frequencies. The host computing platform itself includes one or more computers, each with memory and at least one processor.

Finally, the system includes an SDP dynamic re-constitution module operating in concert with a network controller and disposed within the host computing platform. The module includes computer program instructions. The instructions are enabled while executing in the memory of the host computing platform to authenticate both a device and also a user of the device seeking access to an initial set of network resources defining an initial SDP, to direct the network controller to generate an individual data communications link over which no other device is granted access between the authenticated device and a northbound API to one or more micro-services network application of the initial SDP provisioned for use by the authenticated device.

Notably, the program instructions are additionally enabled to monitor data traffic from the micro-services network applications over the individual data communications link and to submit the monitored data traffic to a predictor. The predictor is adapted to predict a traffic pattern necessitating a change in the initial set of the network resources of the initial SDP. For instance, the traffic pattern may indicate an attempted intrusion or an under-utilization of the network resources of the initial SDP necessitating a reduction in the network resources in the new SDP. The program instructions further are enabled to respond the prediction of a traffic pattern necessitating a change in the initial set of the network resources of the initial SDP by defining a new SDP with a different set of the network resources, terminating the data communications link, and establishing a new data communications link between the authenticated device and the new SDP.

In one aspect of the embodiment, an SDP gateway agent may be deployed behind a firewall in the network that has been configured in a deny-all state. The SDP gateway agent then inspects a log for the firewall in order to identify single packet authentication (SPA) packets. Consequently, the program instructions may perform the authenticating of both the device and the user of the device, and the program instructions may perform the generating of the individual network communications link in response to each identified one of the SPA packets. Optionally, the firewall may be deployed as part of a stack managed by an SDP controller operating at a VNF level and in front of the micro-services network applications.

In this way, the technical deficiencies of the overprovisioning and under-provisioning of resources in an SDN coupled with the undesirable exposure of services in the SDN to prospective malicious actors are overcome owing to the dual deployment of an SDP architecture within the SDN and the dynamic tuning of resources available in an SDP for a singular accessing device on behalf of a corresponding end user interacting with a NetApp inside the SDP responsive to the detected resource needs of the end user accessing the NetApp.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the dynamic re-constitution of an SDP for network applications in a 5G/6G telecommunications network. In accordance with an embodiment of the invention, an initial SDP is deployed for the benefit a dually authenticated end user and corresponding device with a secure data communications link established through the firewall between a northbound API of one or more micro-services network applications in an SDN and the corresponding device. A set of resources are provisioned for the initial SDP sufficient to support the services provided by the micro-services network applications to the end user. Subsequently, traffic over the link is monitored in order to detect a pattern of interaction mapped to a threshold resource requirement. Responsive to detection, a new SDP is deployed with resources provisioned in association therewith meeting the threshold resource requirement. Finally, a new link is established between the corresponding device and the new SDP and the link of the initial SDP is terminated. As a result, the resources available for use by the micro-services network applications providing the services to the end user can be tuned in accordance with the predicted resource requirements of the end user so as to avoid over-provisioning and under-provisioning, while maintaining the security afforded by the deployment of an SDP.

Figure 1:
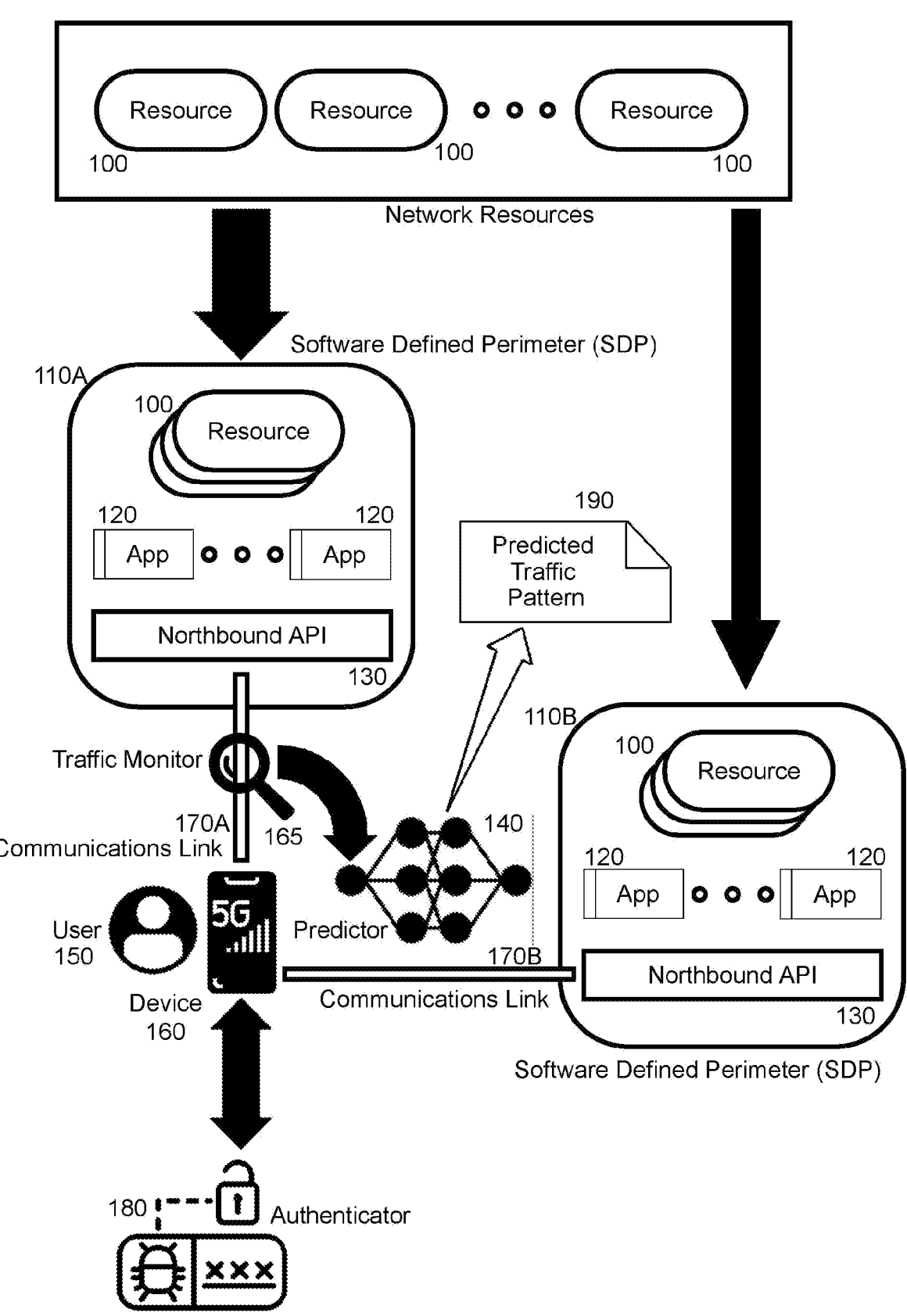
FIG. 1 is a pictorial illustration reflecting different aspects of a process for the dynamic re-constitution of an SDP for network applications in a 5G/6G telecommunications network.

In illustration of one aspect of the embodiment, FIG. 1 pictorially shows a process for dynamically re-constituting an SDP for network applications in a 5G/6G telecommunications network. As shown in FIG. 1, an initial SDP 110A is defined to provide access through a northbound API 130 to different micro-services network applications 120 accessing a set of resources 100 provided in an SDN of a 5G/6G telecommunications network. A secure communications link 170A in the form of an encrypted tunnel is provided between the initial SDP 110A and an end user device 160 of an end user 150, both of which are authenticated by authenticator 180.

Thereafter, a traffic monitor 165 monitors data traffic traversing the secure communications link 170. The traffic monitor 165 submits at least a portion of the data traffic to a predictor 140 trained to correlate submitted traffic with a predicted traffic pattern 190. In this regard, the traffic pattern 190 can indicate a particular application utilization profile indicating a need for a threshold minimum set of the resources 100. Alternatively, the traffic pattern 190 can indicate unauthorized access attempts at the resources 100 defined for the initial SDP 110A. Based upon the predicted traffic pattern 190, a different set of the resources 100 can be specified for a new SDP 110B hosting the same micro-services network applications 120 so as to present a tuned collection of the resources 100 for the predicted traffic pattern 190. As such, a new secure communications link 170B is established between the user device 160 and the new SDP 110A and the communications link 170A is terminated along with the initial SDP 110A.

Figure 2:
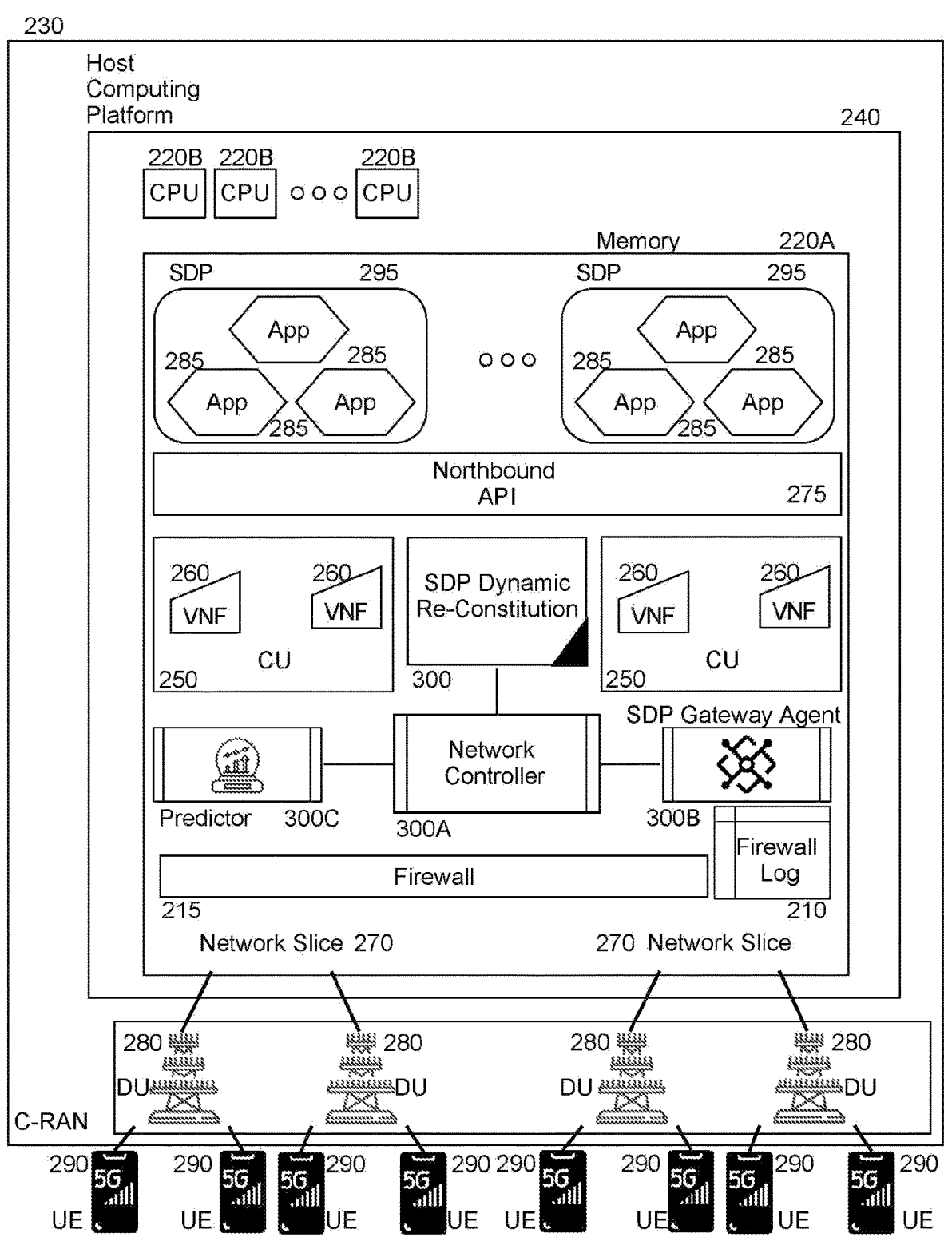
FIG. 2 is a block diagram depicting a data processing system adapted to perform one of the aspects of the process of FIG. 1; and, FIG. 3 is a flow chart illustrating one of the aspects of the process of FIG. 1.

The process described in connection with FIG. 1 may be specifically embodied in an SDN architected mobile telecommunications network. In further illustration, FIG. 2 schematically shows a data processing system disposed within an SDN architected mobile telecommunications network adapted for the dynamic re-constitution of an SDP. The system includes a C-RAN 230 implemented in the control plane of an SDN. The C-RAN 230 includes a host computing platform 240 that includes one or more computers each with memory 220A and one or more processors 220B. Multiple different centralized units (CUs) 250 for respective network slices 270 are defined in the memory 220A.

Each of the CUs 250 includes one or more infrastructure resources 260, namely virtual network functions (VNFs), accessible by different micro-services network applications 285 executing in an application plane of the SDN and accessible through northbound API 275 in order to support processing of cellular network connections with different user equipment (UE) 290 through distributed units (DUs) 280. However, a firewall 215 is inter-disposed between the DUs 280 and the CUs 250 and placed in a deny-all mode. Each request received from one of the DUs 280 from a corresponding one of the UE 290 is captured by the firewall 215 and logged in firewall log 210.

Importantly, a network controller 300A executes as a VNF 260 in the memory 220A. The network controller 300A monitors the firewall log 210 and detects in entries of the firewall log 210, SPA packets received from corresponding ones of the UE 290. In response, the network controller 300A directs SDP Gateway Agent 300B to authentication a corresponding one of the UE 290 and, responsive to the detection of the authentication of both a corresponding one of the UE 290 and an associated end user, directs the SDP Gateway Agent 300B to establish an initial one of the SDPs 295 including a set of one or more micro-services network applications 285 to be accessed by the end user over a secure communications link—namely a transport layer security (TLS) conforming tunnel.

Importantly, an SDP re-constitution module 300 is included in the host computing platform 240 and executes by at least one of the processors 220B of the host computing platform 240. The module 300 includes computer program instructions that when executing by one or more of the processors 220B, is enabled to monitor data traffic running between the initial SDP 295 and the corresponding one of the UE 290. The monitored traffic is submitted to predictor 300C trained to map traffic to a predicted traffic pattern such as an attempted intrusion or an under-utilization of the network resources of the initial SDP 295. Responsive to the predictor 300C, the program instructions of the module 300 dynamically reconstitute the initial SDP 295 into a new one of the SDPs 295 with a different set of resources associated with the predicted traffic pattern of the predictor 300C. The program instructions then terminate the secure communications link to the initial one of the SDPs 295 and establish a new secure communications link to the new one of the SDPs 295 with the corresponding one of the UE 290.

Figure 3:
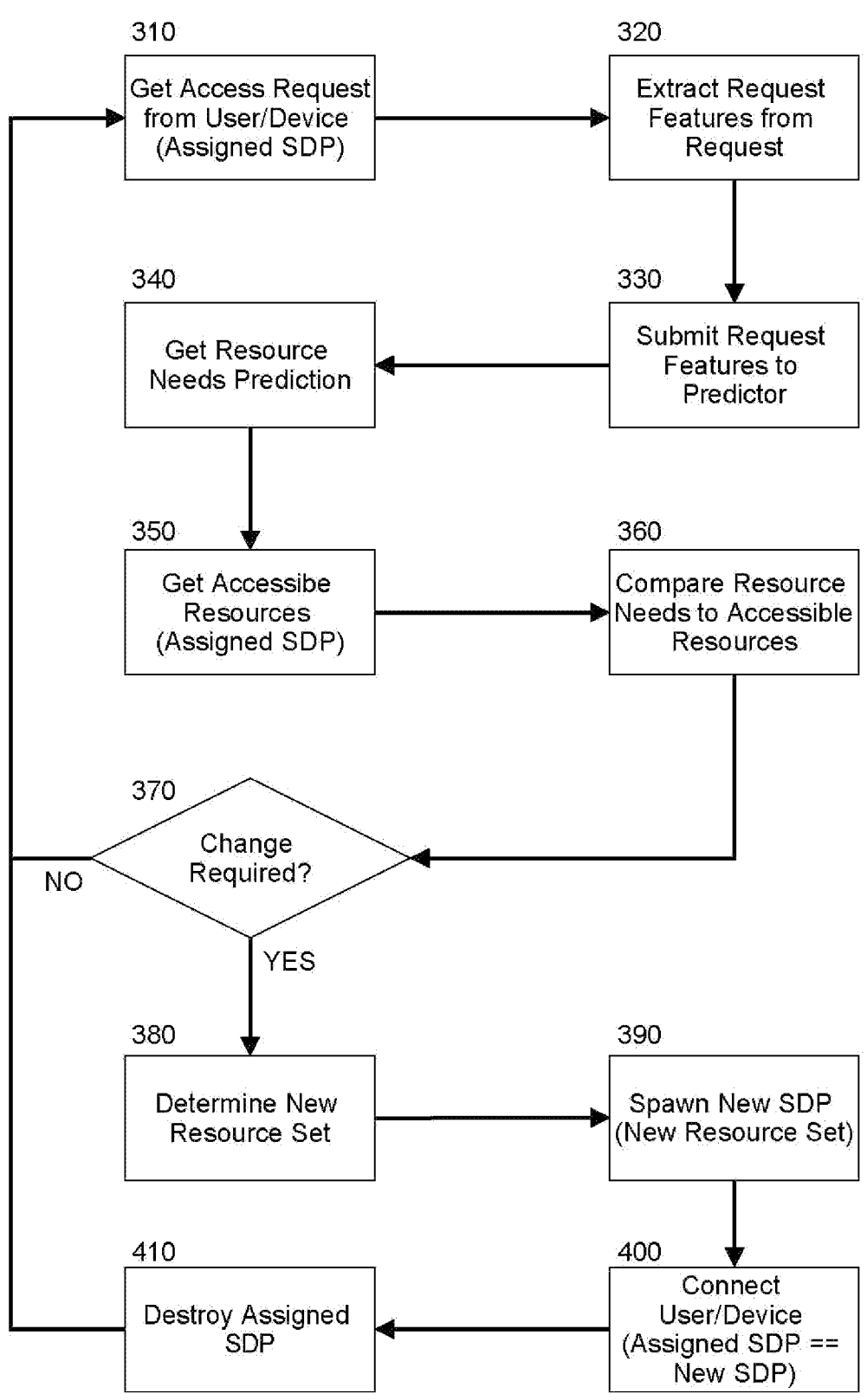

In further illustration of an exemplary operation of the module, FIG. 3 is a flow chart illustrating one of the aspects of the process of FIG. 1. Beginning in block 310, an access request is detected over an existing secure communications link between a specific end user device and a northbound API of an existing SDP. In block 320 request features from the request are extracted and in block 330, the extracted features are presented to a predictor in response to which, in block 340, resource needs are determined from a traffic pattern predicted by the predictor.

In block 350, the accessible resources of the existing SDP are determined and in block 360, the accessible resources are compared to the resource needs. In decision block 370, if a change is required based upon a disparity between the accessible resources and the resource needs, in block 380 a new resource set is determined consistent with the resource needs. Then, in block 390, a new SDP is created to include the new resource set. Finally, in block 400 the end user device is communicatively connected to the new SDP over a secure communications link and in block 410, the existing secure communications link is destroyed.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for the minimization of network resource exposure in a software defined perimeter (SDP) for micro-services network applications in a 5G/6G telecommunications network comprising:

selecting a set of micro-services network applications for access by a specific end user by a specific end user device;

determining a minimal set of resources necessary for the operation of the set of the micro-services network applications;

configuring an initial SDP with the determined minimal set of resources;

authenticating the specific end user and the specific end user device into accessing the SDP of an individual data communications link over which no other device is granted access between the specific end user device and a northbound application programming interface (API) to the set of the micro-services network applications;

performance monitoring the micro-services network applications in the SDP and submitting data from the performance monitoring to a predictor, the predictor predicting a new minimal set of resources; and, responsive to the prediction of the new minimal set of resources, defining a new SDP with the new minimal set of resources, terminating the data communications link, establishing a new data communications link between the authenticated device and the new SDP.

2. The method of claim 1, wherein the data is data traffic from the micro-services network applications over the individual data communications link, the predictor predicting a traffic pattern necessitating a the new minimal set of resources.

3. The method of claim 1, wherein the data is a traffic pattern between the specific end user device and one or more of the micro-services network applications, which indicates an attempted intrusion.

4. The method of claim 1, wherein the data is a traffic pattern between one or more of the micro-services network applications and the resources of the determined minimal set of resources of the initial SDP which indicates an under-utilization of the network resources of the initial SDP necessitating a reduction in the network resources in the new SDP.

5. The method of claim 1, wherein the predictor is a convolutional neural network trained with a set of data consisting of input performance data of the micro-services network applications in a corresponding SDP defined for a specified set of network resources and a corresponding annotation of a utilization of the specified set of network resources.

6. A data processing system adapted for the dynamic re-constitution of a software defined perimeter (SDP) for network applications in a 5G/6G telecommunications network, the system comprising:

a host computing platform hosting in memory a multiplicity of central units (CUs) of the 5G/6G telecommunications network, the CU comprising a communicative coupling to a multiplicity of different distributed units (DUs), at least one of the DUs comprising an antenna transmitting over millimeter wave frequencies, the platform comprising one or more computers, each comprising memory and at least one processor; and, an SDP dynamic re-constitution module operating in concert with a network controller and disposed within the host computing platform, the module comprising computer program instructions enabled while executing in the memory of the host computing platform to perform:

authenticating both a device and also a user of the device seeking access to an initial set of network resources defining an initial SDP;

directing the network controller to generate an individual network communications link over which no other device is granted access between the authenticated device and a northbound application programming interface (API) to one or more micro-services network applications of the initial SDP provisioned for use by the authenticated device;

monitoring data traffic from the micro-services network applications over the individual network communications link and submitting the monitored data traffic to a predictor, the predictor predicting a traffic pattern necessitating a change in the initial set of the network resources of the initial SDP; and, responsive to the prediction of the new minimal set of resources, defining a new SDP with a different set of the network resources, terminating the network communications link, establishing a new communications link between the authenticated device and the new SDP.

7. The system of claim 6, further comprising an SDP gateway agent positioned behind a firewall in the network that has been configured in a deny-all state, the SDP gateway agent inspecting a log for the firewall in order to identify single packet authentication (SPA) packets so that the computer program instructions perform both the authenticating of both the device and the user of the device, and also the generating of the individual network communications link, responsive to each identified one of the SPA packets.

8. The system of claim 7, wherein the firewall is deployed as part of a stack managed by an SDP controller operating at a virtual network function (VNF) level and in front of the micro-services network applications.

9. The system of claim 6, wherein the traffic pattern indicates an attempted intrusion.

10. The system of claim 6, wherein the traffic pattern indicates an under-utilization of the network resources of the initial SDP necessitating a reduction in the network resources in the new SDP.

11. A computing device comprising a non-transitory computer readable storage medium having program instructions stored therein, the instructions being executable by at least one processing core of a processing unit to cause the processing unit to perform the dynamic re-constitution of a software defined perimeter (SDP) for network applications in a 5G/6G telecommunications network, the dynamic re-constitution including:

authenticating both a device and also a user of the device seeking access to an initial set of network resources defining an initial SDP;

generating an individual network communications link over which no other device is granted access between the authenticated device and a northbound application programming interface (API) to one or more micro-services network applications of the initial SDP provisioned for use by the authenticated device;

monitoring data traffic from the micro-services network applications over the individual network communications link and submitting the monitored data traffic to a predictor, the predictor predicting a traffic pattern necessitating a change in the initial set of the network resources of the initial SDP; and, responsive to the prediction of the new minimal set of resources, defining a new SDP with a different set of the network resources, terminating the network communications link, establishing a new communications link between the authenticated device and the new SDP.

12. The device of claim 11, wherein the dynamic re-constitution further includes:

configuring an SDP gateway agent behind a firewall in the network that has been configured in a deny-all state;

inspecting by the SDP gateway agent, a log for the firewall in order to identify single packet authentication (SPA) packets; and, performing both the authenticating of both the device and the user of the device, and also the generating of the individual network communications link, responsive to each identified one of the SPA packets.

13. The device of claim 12, wherein the dynamic re-constitution further includes deploying the firewall as part of a stack managed by an SDP controller operating at a virtual network function (VNF) level and in front of the micro-services network applications.

14. The device of claim 11, wherein the traffic pattern indicates an attempted intrusion.

15. The device of claim 11, wherein the traffic pattern indicates an under-utilization of the network resources of the initial SDP necessitating a reduction in the network resources in the new SDP.

* * * * *